(12) United States Patent
Hedderly

(10) Patent No.: US 6,460,427 B1
(45) Date of Patent: Oct. 8, 2002

(54) ADJUSTMENT LINKAGE FOR TILTING AND TELESCOPING A STEERING COLUMN ASSEMBLY

(75) Inventor: Gregory Thomas Hedderly, White Lake, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,627

(22) Filed: Jan. 28, 2002

(51) Int. Cl.[7] .................................................. B62D 1/18
(52) U.S. Cl. ......................................... 74/493; 280/775
(58) Field of Search ................... 74/492, 493; 280/777, 280/779, 775

(56) References Cited

U.S. PATENT DOCUMENTS

| | | |
|---|---|---|
| 4,541,298 A | 9/1985 | Strutt |
| 5,082,311 A | 1/1992 | Melotik |
| 5,361,646 A * | 11/1994 | Venable ........................ 74/493 |
| 5,439,252 A * | 8/1995 | Oxley et al. ................. 280/775 |
| 5,470,107 A | 11/1995 | Muntener et al. |
| 5,890,397 A * | 4/1999 | Stoner et al. ................ 280/775 |
| 5,979,265 A | 11/1999 | Kim et al. |
| 6,068,295 A | 5/2000 | Skabrond et al. |
| 6,095,012 A | 8/2000 | Lutz |
| 6,152,489 A | 11/2000 | Hedderly et al. |
| 6,234,040 B1 | 5/2001 | Weber et al. |
| 6,237,439 B1 * | 5/2001 | Weber et al. ................ 280/777 |
| 6,244,128 B1 * | 6/2001 | Spencer et al. ............. 280/753 |
| 6,327,928 B1 * | 12/2001 | Bowerman et al. ....... 74/473.15 |
| 6,371,551 B1 * | 4/2002 | Hedderly ...................... 180/90 |
| 2002/0020245 A1 * | 2/2002 | Gaukel ......................... 74/493 |

OTHER PUBLICATIONS

U.S. patent application Ser. No. 09/695,340, filed Oct. 24, 2000, entitled "Integrated Steering Column, Instrument Panel, and Cowl Body Structure".

* cited by examiner

*Primary Examiner*—David Fenstermacher
(74) *Attorney, Agent, or Firm*—Gregory P. Brown

(57) ABSTRACT

A tilting and telescoping steering column assembly includes a linkage operatively associated with tilt and telescope locking mechanisms for adjustment of a steering column shaft. The linkage includes a first portion which is pivotally movable with the steering column shaft, a second portion operatively connected to the tilt and telescope locking mechanisms, and a slidable link member between the first and second portions adjacent the tilt pivot joint. The slidable link member is connected to the second portion by an arcuate slot member and slot follower pin to accommodate pivotal movement of the first portion with respect to the second portion. This configuration enables an operating lever to tilt and telescope with the steering wheel so that the operator need not take his or her hands off the steering wheel for tilt and telescoping adjustment.

14 Claims, 9 Drawing Sheets

ADJUSTMENT LINKAGE FOR TILTING AND TELESCOPING A STEERING COLUMN ASSEMBLY

BACKGROUND OF INVENTION

1. Field of the Invention

The present invention relates to an adjustment linkage for a tilting and telescoping steering column assembly in which an actuating lever for tilting and telescoping pivots with the steering column while positioning adjustments are made.

2. Background Art

Vehicle steering column assemblies sometimes include tilting and telescoping features for steering wheel adjustment. These adjustment features typically include separate levers for tilting and telescoping adjustment.

U.S. Pat. No. 6,237,439 provides an improved steering column assembly with a single release lever which actuates tilting and telescoping movement of the steering column, and in which the tilt and telescope features are fully contained within the steering column assembly, thereby eliminating the need for additional attachment steps when assembling the steering column assembly into the vehicle.

It is further desirable to provide a tilting and telescoping steering column assembly in which an actuating lever moves with the tilting and telescopic adjustment motion of the steering wheel so that the operator does not have to take their hands off of the steering wheel while adjusting the steering wheel position.

SUMMARY OF INVENTION

The present invention provides a tilting and telescoping steering column assembly including an adjustment lever and adjustment features which are incorporated into a modular, integrated steering column assembly. The system includes an adjustment linkage which allows the driver to keep their hands on the steering wheel while releasing the steering column for tilt and telescopic adjustments, with the ability to release one such adjustment at a time.

This adjustment capability is achieved via the linkage which includes a slidable link, arcuate slot and slot follower pin which enable translation of adjustment motions through the tilting axis of the steering column assembly so that the adjustment lever may tilt with the steering wheel.

More specifically, the invention provides a tilting and telescoping steering column assembly including a steering column shaft pivotally connected to an intermediate shaft at a tilt pivot joint. A tilt locking mechanism is operatively associated with the steering column shaft to allow selective tilting adjustment of the steering column shaft. A telescope locking mechanism is operatively associated with the intermediate shaft to allow selective telescopic adjustment of the steering column shaft. A linkage includes a first portion which is pivotally movable with the steering column shaft, a second portion operatively connected to the tilt and telescope locking mechanisms, and a slidable link member between the first and second portions adjacent the tilt pivot joint. The slidable link member is connected to the first portion by an arcuate slot member and slot follower pin to accommodate pivotal movement of the first portion with respect to the second portion. An actuator lever is connected to the linkage and pivotable with the steering column shaft during tilting adjustment of the steering column shaft.

Preferably, the steering column shaft is pivotally connected to a sleeve about a pivot axis and extends out of the sleeve to receive a steering wheel. The sleeve is slidably positioned within a housing and includes a telescope gear member. The housing is configured for attachment to a vehicle support structure, and includes an internal rack extending longitudinally within the housing for engagement with the telescope gear member. The telescope gear member is lockable and unlockable by a pawl for selective telescoping of the sleeve with respect to the housing.

Preferably, the arcuate slot member is integral with the slidable link member, and the slidable link member is intersected by the pivot axis of the tilt pivot joint.

The pawl, which forms the telescope locking mechanism, includes a dwell slot formed therein, and the second portion of the linkage includes a dwell pin cooperating with the dwell slot to delay unlocking of the telescope gear member while the tilt locking mechanism is unlocked to allow tilting of the steering column shaft.

Preferably, a mechanical advantage arm is connected to the steering column shaft and extends into the sleeve in a direction opposite the steering column shaft with respect to the pivot axis. The arm has a distal end with at least one tooth. The tilt locking mechanism is secured to the sleeve and engageable with the tooth to lock the arm and steering column shaft in a desired tilt position. The tilt locking mechanism includes a pivotable lock member connected to the second portion and having upper and lower teeth engageable with the tooth on the arm. The lock member is pivotable between a first position in which the lower teeth are engaged, a second position in which no teeth are engaged to allow tilting of the steering column shaft, and a third position in which the upper teeth are engaged.

The telescope gear member preferably includes an inner gear which is engageable with the pawl and first and second outer gears engaged with the internal rack.

An energy dissipation device is positioned between the inner and outer gears to dissipate energy when the outer gears are forcibly rotated with respect to the inner gear. The energy dissipation device includes a pin connected to the inner gear and engaged with slots formed on first and second steel disks which are connected to the first and second outer gears, respectively, such that forcible rotation of the outer gears causes the disks to cold form as the pin is forced through the slots.

A plurality of roller devices are provided on the telescope sleeve to facilitate telescoping movement of the sleeve with respect to the housing. Each roller device includes first and second axially offset washers which are configured to counter-rotate during telescoping movement of the sleeve. The washers are positioned on axles which are rotationally spring-biased to force the washers against opposing walls of the respective channel which receives the washers.

Accordingly, an object of the invention is to provide an improved tilting and telescoping steering column assembly in which a tilt/telescope adjustment lever is tiltable with the steering column shaft so that the driver does not have to remove his or her hands from the steering wheel to actuate the lever and adjust the steering wheel.

The above object and other objects, features, and advantages of the present invention are readily apparent from the following detailed description of the best modes for carrying out the invention when taken in connection with the accompanying drawings.

DETAILED DESCRIPTION

Figure 1:
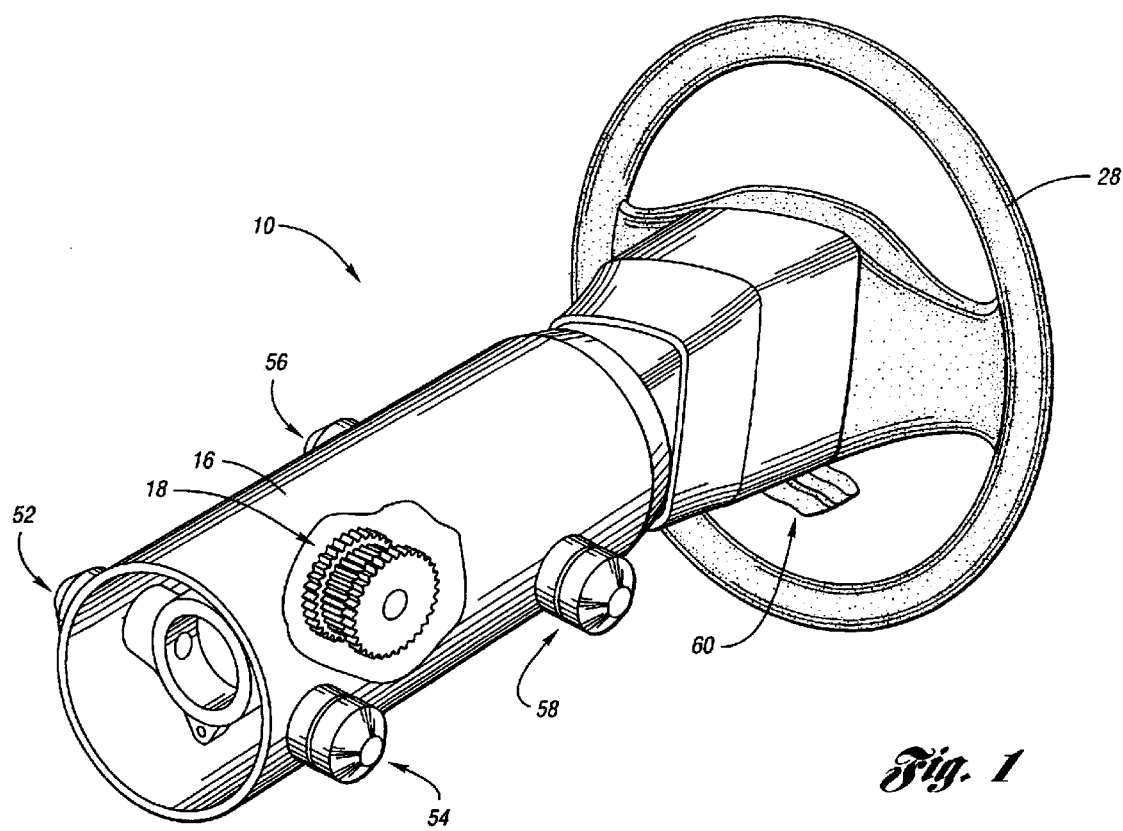
FIG. 1 shows a schematic perspective view of a steering column assembly in accordance with the invention.
Figure 2:
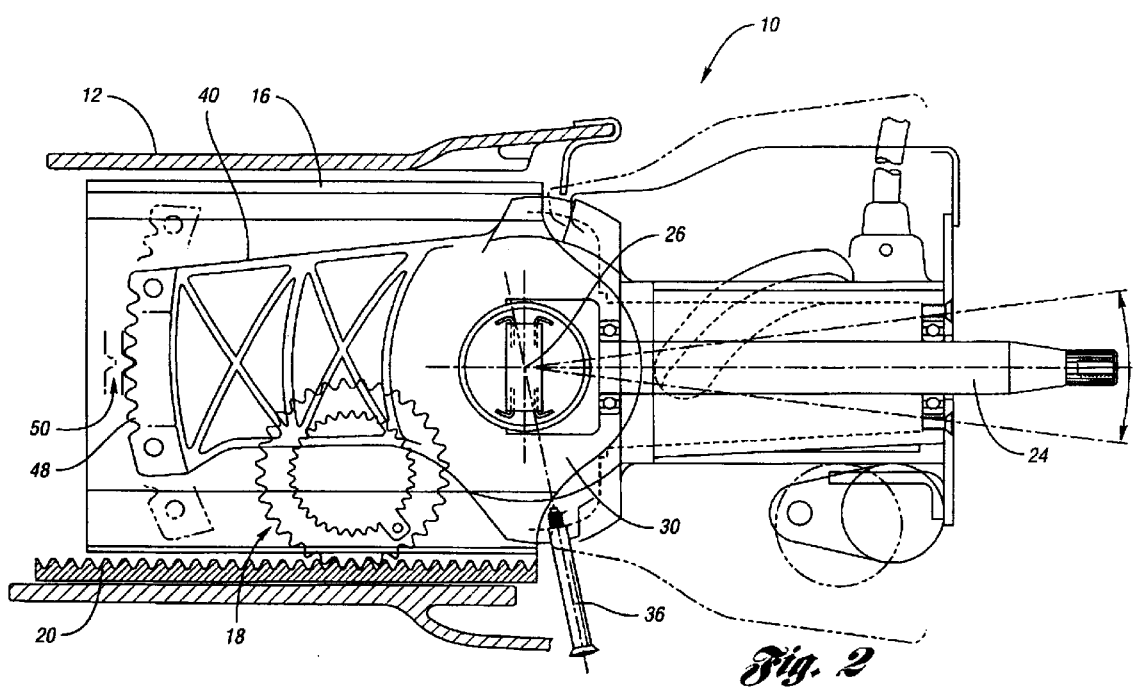
FIG. 2 shows a longitudinal cross-sectional view of a steering column assembly corresponding with the embodiment of FIG. 1.
Figure 3:
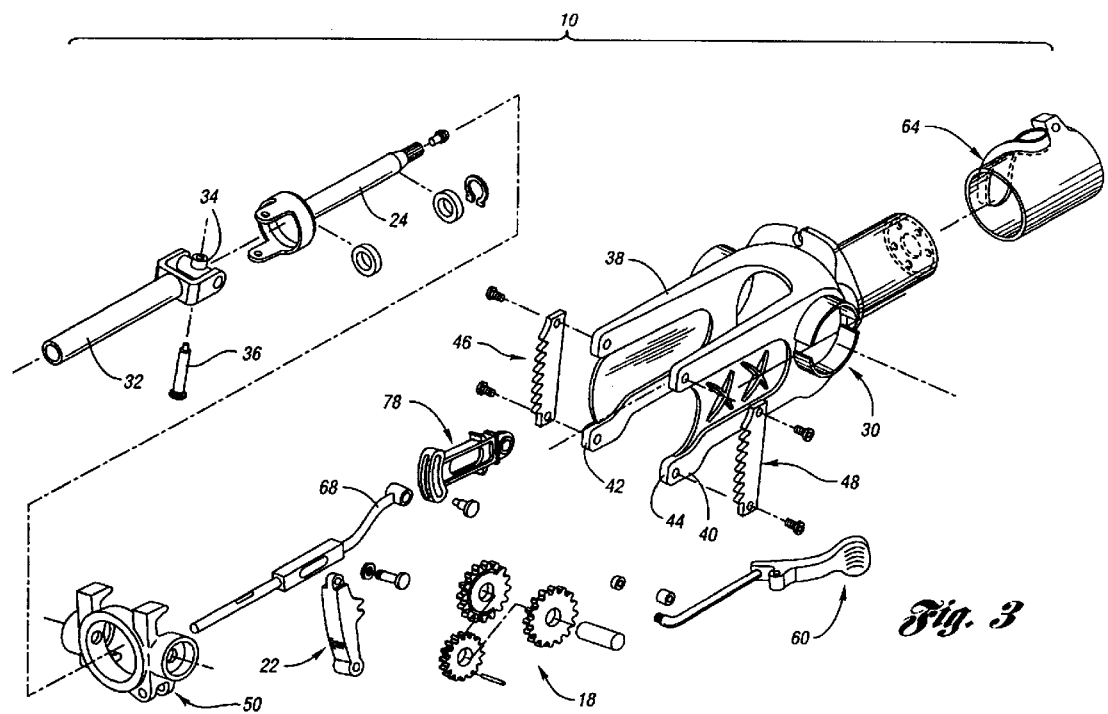
FIG. 3 shows an exploded perspective view of a steering column assembly corresponding with the embodiment of FIG. 1.
Figure 8:
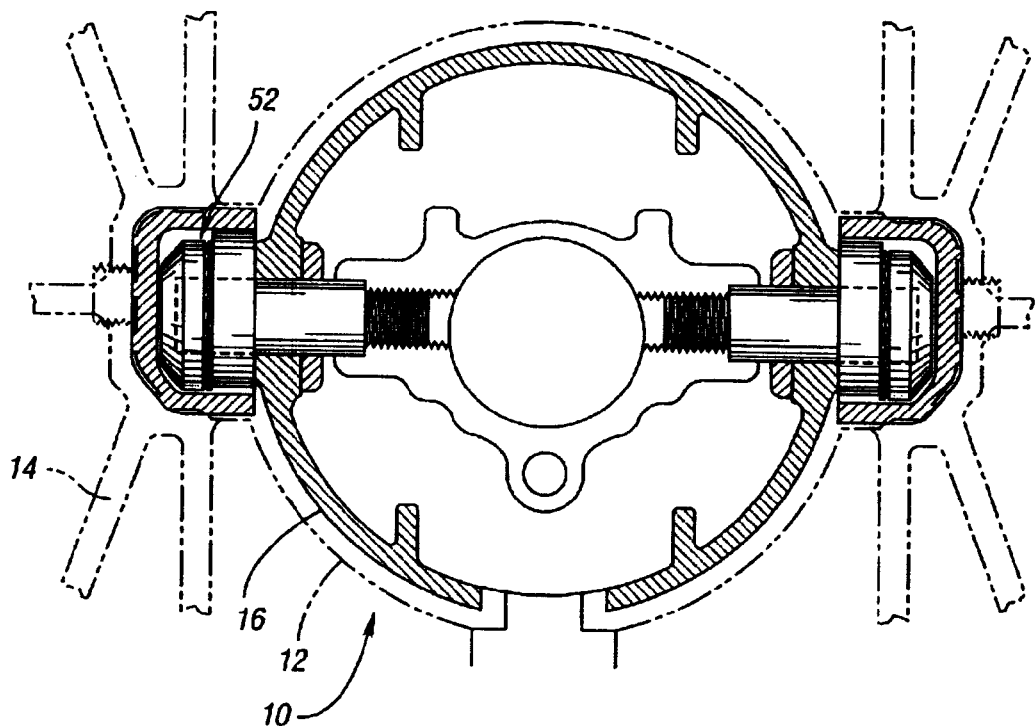
FIG. 8 shows a partial vertical cross-sectional view of the steering column assembly of FIGS. 1–7.

FIGS. 1–3 show perspective, cross-sectional and exploded views, respectively, of a steering column assembly 10 in accordance with the invention. Referring to FIG. 8, the steering column assembly 10 includes a stationary housing 12 which is mounted to a vehicle support structure 14. By way of example, the present invention could be implemented in an instrument panel support structure as described in commonly owned U.S. patent application Ser. No. 09/695,340, filed Oct. 24, 2000, entitled "Integrated Steering Column, Instrument Panel, and Cowl Body Structure", which is hereby incorporated by reference.

Returning to FIGS. 1–3, the housing 12 slidably receives a telescope sleeve 16. The telescope sleeve 16 carries a telescope gear member 18 which engages teeth on an internal rack 20 of the housing 12 for telescoping adjustment of the sleeve 16 with respect to the housing 12. The telescope gear member 18 is lockable and unlockable by a pawl 22, shown in FIG. 3, for selective telescoping adjustment.

A steering column shaft 24 is pivotally connected to the sleeve 16 about a pivot axis 26, shown in FIG. 2, and extends out of the sleeve 16 to receive a steering wheel 28, shown in FIG. 1.

As shown in FIGS. 2 and 3, the steering column shaft 24 extends into a column support structure 30, and is pivotally connected to an intermediate shaft 32, shown in FIG. 3, by a four-way hub 34 and attachment bolt 36.

The column support structure 30 includes mechanical advantage arms 38,40. The mechanical advantage arms 38,40, and the entire column support structure 30, is rigidly connected to the steering column shaft 24 for pivotal movement therewith when the steering wheel 28 is pivoted with respect to the pivot axis 26. The mechanical advantage arms 38,40 extend into the sleeve 16 in a direction opposite the steering column shaft 24 with respect to the pivot axis 26. The distal ends 42,44 of the arms 38,40, respectively, include toothed tilt position plates 46,48 mounted thereon.

A tilt locking mechanism 50, shown schematically in FIG. 2 as a single tooth, is movable with the sleeve 16, and pivotable for engagement with the teeth on the tilt position plates 46,48. The engagement of the tilt locking mechanism 50 with the tilt position plates 46,48 selectively locks the mechanical advantage arms 38,40 and the steering column shaft 24 in a desired tilt position about the pivot axis 26. Various embodiments of the tilt locking mechanism are contemplated within the scope of the present invention.

Figure 9:
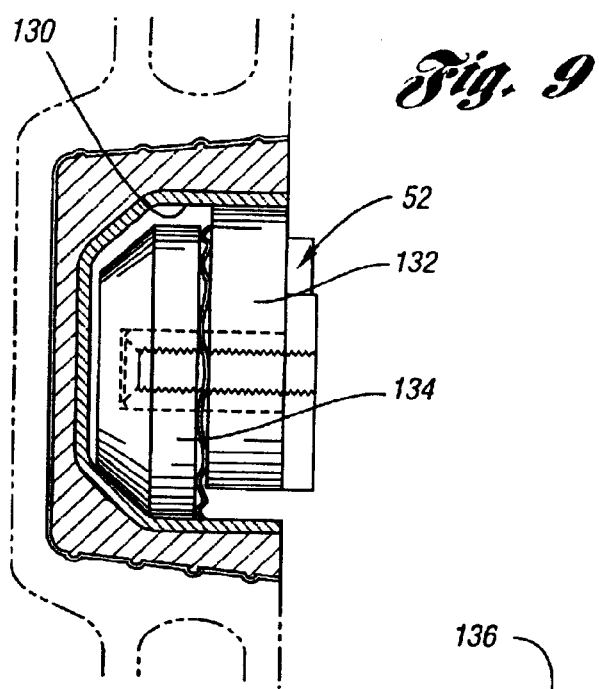
FIG. 9 shows a side view of a roller assembly as shown in FIG. 8.

Returning to FIG. 1, rollers 52,54,56,58 are provided on the sleeve 16 to facilitate rolling/sliding adjustment of the sleeve 16 with respect to the housing 12, as further illustrated in FIG. 9. These rollers will be described in greater detail below in the description provided for FIGS. 9–11.

Also shown in FIG. 1 is an operating lever 60 which is adjustable between the "all lock", "tilt release", "lock", and "telescope unlock" positions. The operating lever 60 pivots with the steering wheel 28 when the steering column shaft 24 is pivoted about the pivot axis 26 during tilting adjustment of the steering wheel 28 so that the driver need not take his or her hands off the steering wheel 28 to adjust the tilt or telescope position of the steering wheel 28.

FIG. 3 also shows a shift socket 64 which slides onto and is guided by the upper steering column.

Figure 4:
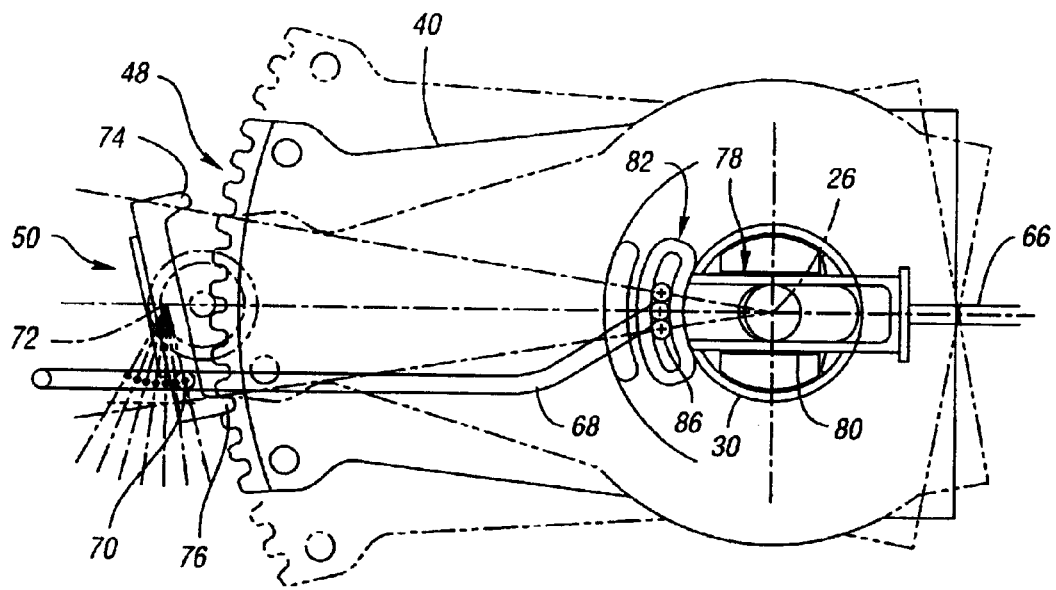
FIG. 4 shows a schematic longitudinal cross-sectional view of a tilt locking feature corresponding with the embodiment of FIG. 1.
Figure 4A:
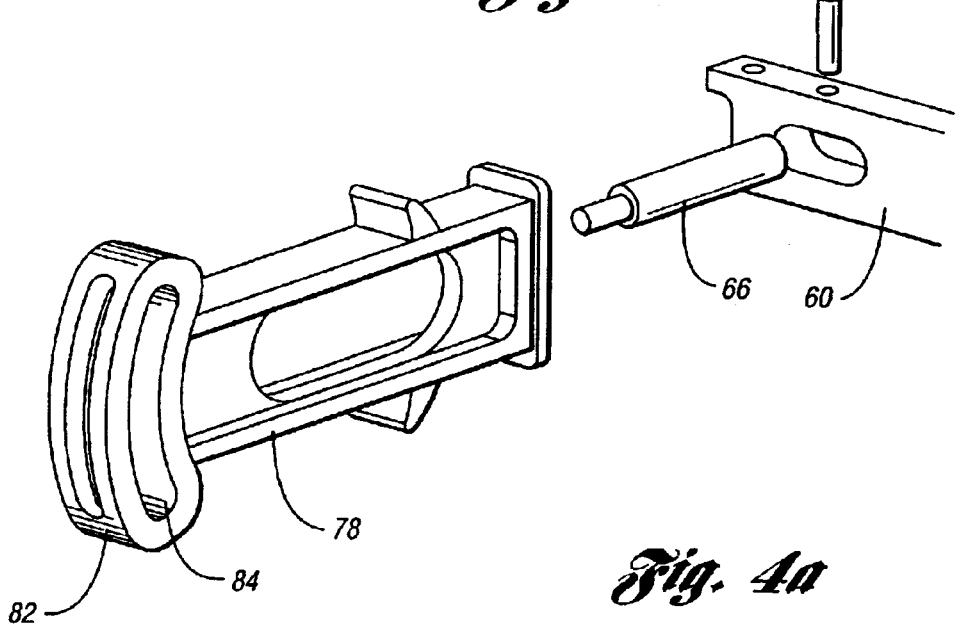
FIG. 4a shows a schematic exploded perspective view of part of a linkage corresponding with the structure shown in FIG. 4.

As further shown in FIG. 3, the operating lever 60 is operatively connected to the pawl 22 and to the tilt locking mechanism 50 by a linkage, which is shown in FIGS. 4 and 4a. As shown in FIGS. 4 and 4a, the linkage includes a first portion 66 which is pivotally movable with the steering column shaft 24, and a second portion 68 which is connected to the pawl 22 and the tilt locking mechanism 50. The connection between the second portion 68 and the pawl 22 will be more readily understood with reference to FIGS. 5 and 6, described below.

Still referring to FIG. 4, the second portion 68 is connected to the tilt locking mechanism 50 at an attachment point 70 to selectively cause pivotal movement of the tilt locking mechanism 50 about the pivot axis 72 so that the upper and lower teeth 74,76 may selectively engage the teeth on the tilt position plates 46,48. In the position shown in FIG. 4, the lower tooth 76 is engaged with the toothed tilt position plate 48. When the operating lever 60 is actuated to move the second portion 68 of the linkage to the left as viewed in FIG. 4, the tilt locking mechanism 50 rotates clockwise to a position in which the upper and lower teeth 74,76 are both disengaged from the teeth on the tilt position plate 48. In this position, the tilted position of the steering column shaft can be adjusted. When the operating lever 68 is actuated further so that the upper tooth 74 engages the tilt position plate 48, the steering column shaft 24 is then locked in the selected tilted position.

In order to accommodate tilting of the steering column shaft 24, the first portion 66 of the linkage must be pivotable with respect to the second portion 68 of the linkage. Accordingly, as shown in FIGS. 4 and 4a, a slidable link member 78 is provided between the first and second portions 66,68 in a position intersected by the pivot axis 26. The slidable link member 78 is slidable in a slot 80 formed in the column support structure 30. The slidable link member 78 includes an arcuate slot member 82 which forms an arcuate slot 84 therein to receive a slot follower pin 86 which is connected to the second portion 68 of the linkage.

As viewed in FIG. 4, the slidable link member 78 is slidable to the left, and the slot follower pin 86 is movable along the arcuate slot 84 to accommodate pivotal movement of the first portion 66 of the linkage with respect to the second portion 68. It is this sliding movement of the link member 78 and slot follower pin 86 which enables pivotal movement of the first portion 66 so that the operating lever 60 may tilt and telescope with the steering wheel 28 as the steering wheel 28 is adjusted so that the driver need not take his or her hands off the steering wheel when adjusting the steering wheel because the operating lever 60 moves with the steering wheel 28.

The invention contemplates various embodiments of the linkage, and of the tilt and telescoping locking mechanisms. For example, it is contemplated that the operating lever 60 may be configured as a "push" or "pull" mechanism within the scope of the invention.

Figure 5:
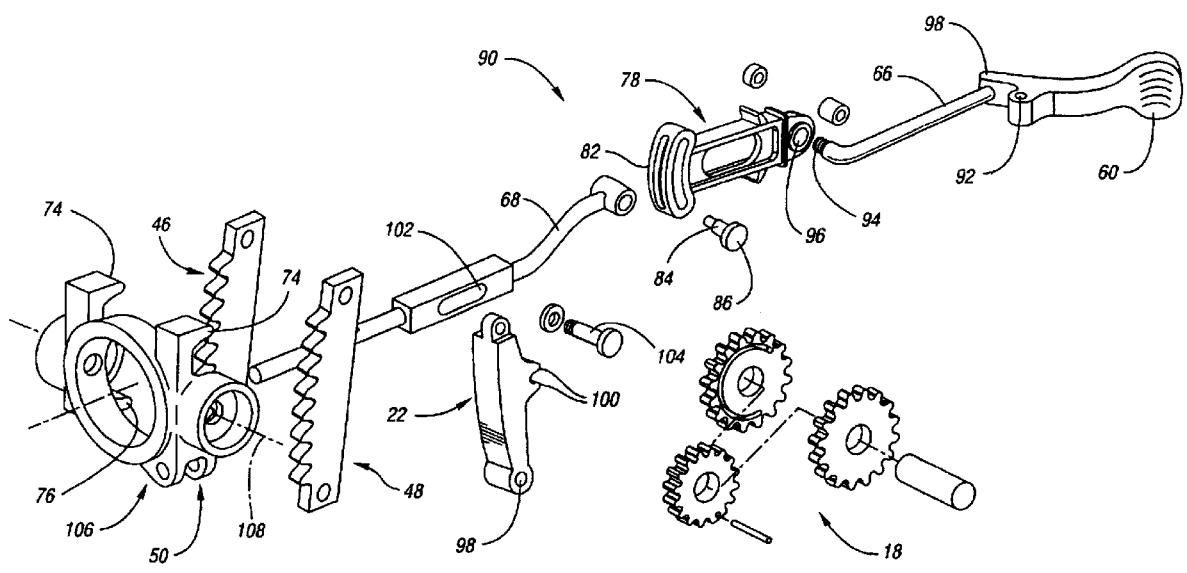
FIG. 5 shows an exploded perspective view of the linkage shown in FIG. 3.

FIG. 5 more clearly shows the linkage 90 which may be used for tilting and telescoping adjustment of the steering wheel in accordance with the invention. The operating lever 60 is pivotally connected with respect to the steering wheel 28 at a pivot joint 92. The operating lever 60 is connected at an end 98 to the first portion 66 of the linkage 90. A threaded end 94 of the first portion 66 is engaged within an opening 96 in the slidable link member 78. The slidable link member 78 includes the arcuate slot member 82 having the arcuate slot 84 formed therein to receive a slot follower pin 86. The slot follower pin 86 is connected to the second portion 68 of the linkage 90. The pawl 22 is pivotally connected to the sleeve at a pivot joint 98, and includes teeth 100 which are engageable with the telescope gear member 18 for selective locking and unlocking of telescope movement of the sleeve with respect to the housing.

Still referring to FIG. 5, the second portion 68 of the linkage 90 includes a dwell slot 102 which receives a dwell pin 104 to delay unlocking of the telescope gear member 18 while the tilt locking mechanism 50 is unlocked to allow tilting of the steering column shaft. Accordingly, the tilt locking mechanism 50 may be operated independently from the pawl 22, which functions as the telescope locking mechanism.

As shown in FIG. 5, the tilt locking mechanism 50 includes the pivotable lock member 106 which is connected to the second portion 68 of the linkage 90 to actuate pivoting movement of the pivotable lock member 106 about its pivot axis 108. As shown in FIG. 5, the pivotable lock member 106 includes teeth 74,76 which are engageable on the teeth of the arcuate racks 46,48 which are fixed to the mechanical advantage arms 38,40 of FIG. 3. Accordingly, when the second portion 68 of the linkage 90 is moved to pivot the lock member 106 clockwise, as viewed in FIG. 5, the teeth 74,76 are engaged into the adjustment positions of the arcuate rack 48 to allow locking of tilting movement of the steering column shaft. During this pivotal movement of the lock member 106, the dwell pin 104 slides within the dwell slot 102, and does not reach either end of the dwell slot 102. After tilt adjustment has been accomplished, the linkage may be moved further to bottom-out the dwell pin 104 at an end of the dwell slot 102 to disengage the teeth 100 of the pawl 22 from the telescope gear member 18 to allow telescoping movement of the steering column shaft.

Figure 6:
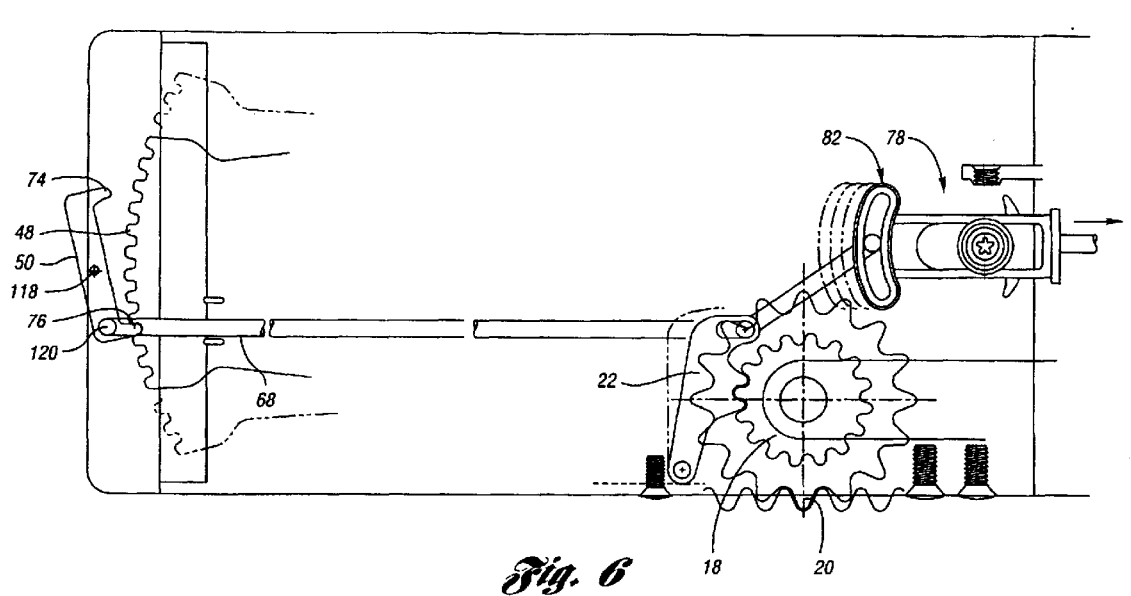
FIG. 6 shows a schematic side view of tilt and telescope locking features in the steering column assembly of FIGS. 1–5.
Figure 7:
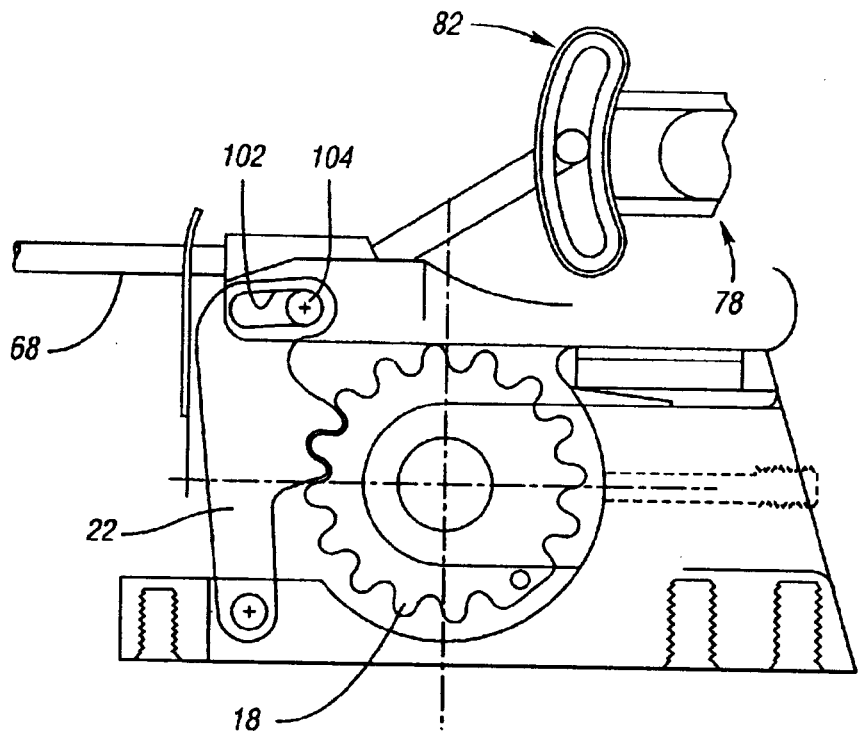
FIG. 7 shows an enlarged, partially cut-away side view of the telescope locking mechanism of FIG. 6.

FIGS. 6 and 7 further illustrate the tilting and telescoping features. The tilt locking mechanism 50 is pivotally movable about a pivot joint 118 by movement of the second portion 68 of the linkage, which is connected to the tilt locking mechanism 50 at the joint 120. The tilt locking mechanism 50 includes upper and lower lock teeth 74,76 which are selectively engageable with the teeth on the tilt position plate 48 to selectively lock the mechanical advantage arm 40 and steering column shaft.

The tilt locking mechanism 50 is pivotable between a first position in which the lower tooth 76 is engaged with the teeth of the tilt position plate 48, a second position in which neither of the teeth 74,76 are engaged with the teeth of the tilt position plate 48, and a third position in which the upper tooth 74 is engaged with the teeth of the tilt position plate 48. The steering column shaft is tiltable only when the tilt locking mechanism 50 is in the second position described above with neither of the teeth 74,76 engaged with the teeth of the tilt position plate 48.

FIGS. 6 and 7 also illustrate the pawl 22 and its engagement with the telescope gear member 18. As most clearly shown in FIG. 7, the second portion 68 of the linkage includes a pin 104 which is slidable within the dwell slot 102 of the pawl 22 to accommodate for the adjustment of the tilt locking mechanism 50 described above. When the pin 104 bottoms-out at the left end of the slot 102, as viewed in FIG. 7, further leftward movement of the second portion 68 causes the pawl 22 to be pivoted away from the telescope gear member 18 so that the respective teeth are disengaged, and the telescope gear member 18 may roll along the rack 20 for telescoping adjustment. In order to accommodate this further leftward movement of the second portion 68, the joint 120 will include a lost motion device, as described below with reference to FIG. 14.

Figure 14:
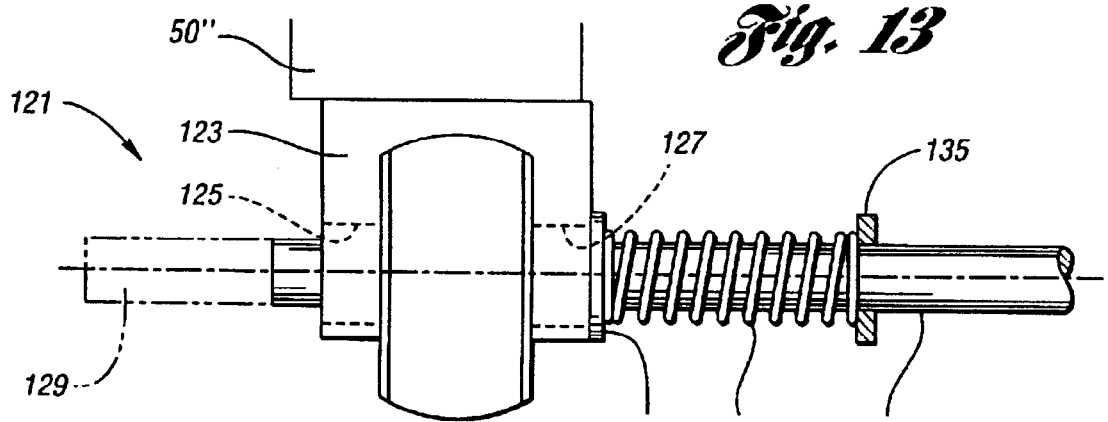
FIG. 14 shows a side view of a lost motion device in accordance with the invention.

Referring to FIG. 14, a lost motion device 121 is illustrated for implementation at the joint 120, for example, shown in FIG. 6. The joint 120 of FIG. 7 would be replaced by the bracket 123 having elongated apertures 125,127 to slidably receive the second portion 68 of the linkage, corresponding with that shown in FIG. 6. The apertures 125,127 are elongated to accommodate tilting of the bracket with respect to the second portion 68. When the tilt locking mechanism 50 shown in FIG. 6 is in the third position described above with the upper teeth 74 engaged to the teeth of the tilt position plate 48, further leftward movement of the second portion 68 would be absorbed by the lost motion device 121 because the distal end 129 of the second portion 68 would "over-travel" through the elongated apertures 125,127, and compress the spring 131 between the washers 133,135. In this manner, the tilt locking mechanism 50 need not pivot further clockwise beyond the third position described above while the pawl 22, shown in FIGS. 6 and 7, is pivoted between locked and unlocked positions for telescope adjustment.

FIG. 8 shows a vertical cross-sectional view of the steering column assembly 10. As shown, the sleeve 16 is circular in cross-sectional configuration. Roller devices 52,54 are movable with the sleeve 16 to facilitate telescoping movement of the sleeve with respect to the housing 12. As shown in FIG. 1, preferably four such roller devices 52,54,56,58 are provided on the sleeve 16.

Figure 10:
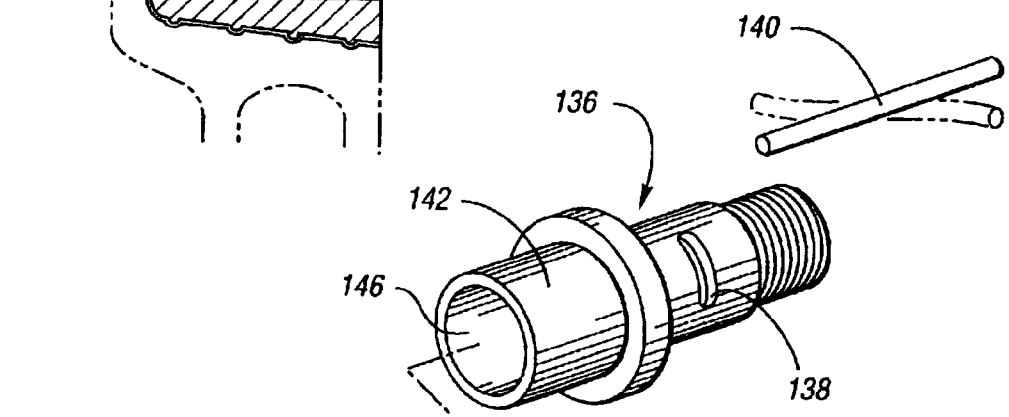
FIG. 10 shows an exploded perspective view of the roller assembly of FIG. 9.
Figure 10:
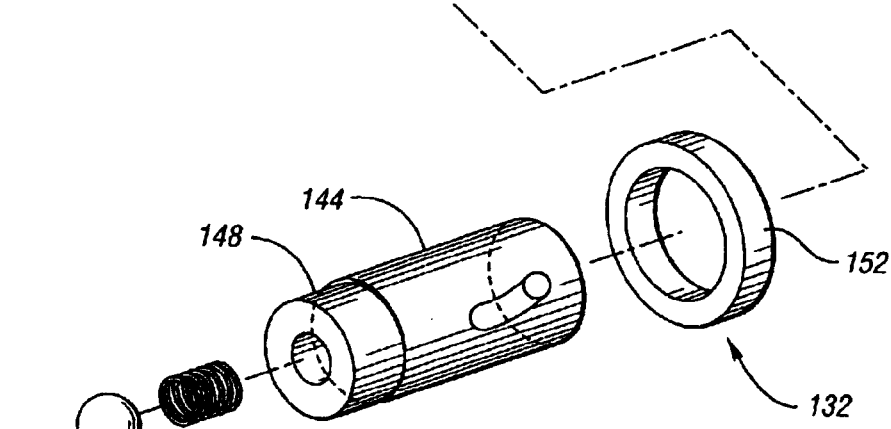
Figure 10:
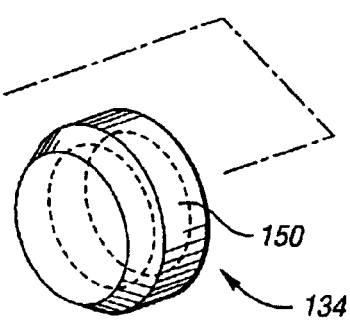

The structure of these roller devices is shown in greater detail in FIGS. 9 and 10. As shown, the roller device 52 travels in a channel 130. The roller device 52 includes first and second axially offset washers 132,134 which are positioned against upper and lower walls of the channel 130, respectively, and counter-rotate with respect to each other during telescoping movement of the sleeve. During crash collapse, the roller devices additionally provide a robust carriage for low friction steering column collapse. As shown in FIG. 10, a stud 136 includes a slot 138 to receive a spring member 140 to rotatably bias the stud member 144 with respect to the sleeve. The washer 132 is positioned on the OD surface 142, and the pin 144 is positioned within the opening 146. The pin 144 includes a machined, or cold formed offset OD surface 148 which is cylindrical and has an offset central axis with respect to the central axis of the pin 144. The washer 134 is positioned on the offset OD surface 148 so that the OD surface 150 of the washer 134 is offset with respect to the OD surface 152 of the washer 132 in the final assembly. As a result of the rotational movement provided by the spring bias of the spring member 140, the washers 132,134 are forced against the upper and lower walls of the channel 130, as shown in FIG. 9.

Figure 11:
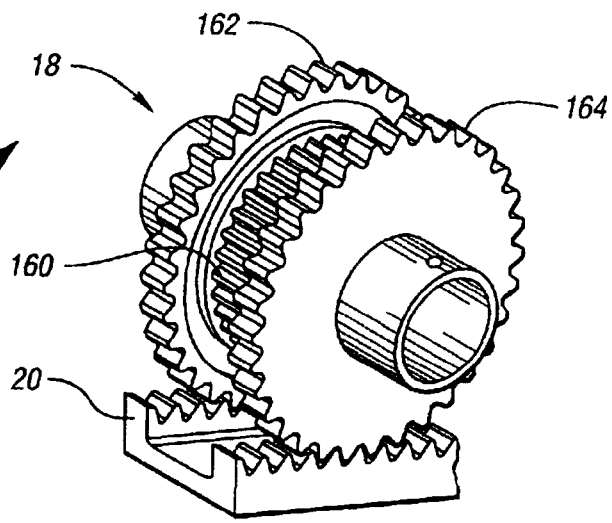
FIG. 11 shows a perspective view of a telescope gear member and rack in accordance with the invention.
Figure 12:
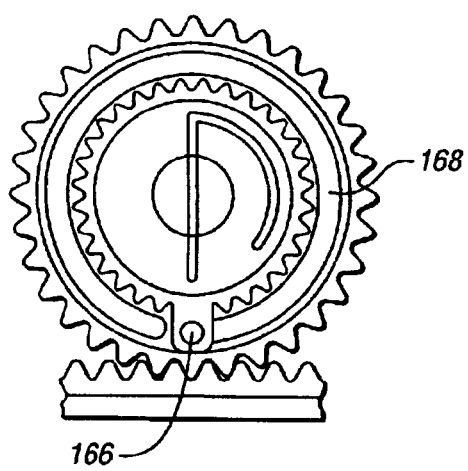
FIG. 12 shows a partially dissembled end view of the telescope gear member of FIG. 11.
Figure 13:
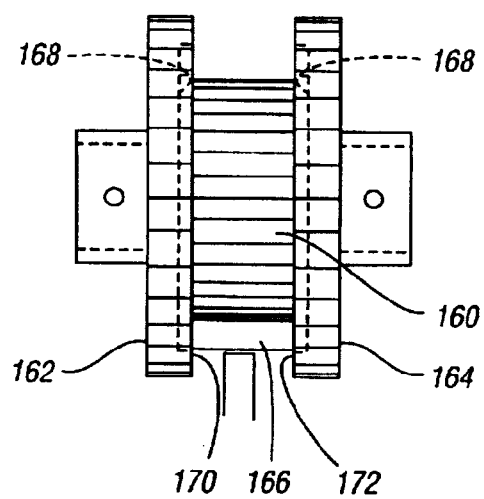
FIG. 13 shows a side view of the telescope gear member of FIG. 11.

Turning to FIGS. 11–13, the telescope gear member 18 is shown. As shown, the telescope gear member 18 includes an inner gear 160 which is sandwiched between first and second outer gears 162,164. The outer gears 162,164 are engaged with the teeth of the rack 20 for telescoping movement of the sleeve with respect to the housing as described previously.

An energy dissipation device is positioned between the inner and outer gears 160,162,164 to dissipate energy when the outer gears 162,164 are forcibly rotated with respect to the inner gear 160. The energy dissipation device includes at least one pin 166 which is carried by the inner gear 160 and engaged with slots 168 formed on first and second steel disks 170,172 which are connected to the first and second outer gears 162,164, respectively, such that forcible rotation of the outer gears 162,164 causes the disks to cold form as the pin 166 is forced through the slots 168, thereby dissipating energy.

While the best modes for carrying out the invention have been described in detail, those familiar with the art to which this invention relates will recognize various alternative designs and embodiments for practicing the invention within the scope of the appended claims.

What is claimed is:

1. A tilting and telescoping steering column assembly comprising:
    a housing configured for attachment to a vehicle support structure, said housing including a longitudinally extending internal rack;
    a telescope sleeve slidably positioned within the housing and including a telescope gear member engaged with the internal rack, said telescope gear member being lockable and unlockable by a pawl for selective telescoping of the telescope sleeve;
    a steering column shaft pivotally connected to the sleeve about a pivot axis and extending out of the sleeve to receive a steering wheel;
    a mechanical advantage arm connected to the steering column shaft and extending into the sleeve in a direction opposite the steering column shaft with respect to the pivot axis, said arm having a distal end with at least one locking feature;
    a tilt locking mechanism secured to the sleeve and engageable with said locking feature to position the steering column shaft in a desired tilt position; and
    an operating lever connected to the pawl and tilt locking mechanism by a linkage including a first portion which is pivotally movable with the steering column shaft and a second portion connected to the pawl and tilt locking mechanism, said linkage including a slidable link member between said first and second portions and supported in a position intersected by the pivot axis, said linkage being operatively associated with an arcuate slot member and slot follower pin to accommodate pivotal movement of the first portion with respect to the second portion.

2. The tilting and telescoping steering column assembly of claim 1, wherein said arcuate slot member is integral with the slidable link member, and the slot follower pin is connected to an end of the second portion.

3. The tilting and telescoping steering column assembly of claim 1, wherein said pawl includes a dwell slot formed therein and said second portion includes a dwell pin cooperating with the dwell slot to delay unlocking of the telescope gear member while the tilt locking mechanism is unlocked to allow tilting of the steering column shaft.

4. The tilting and telescoping steering column assembly of claim 1, wherein the tilt locking mechanism comprises a pivotable lock member having upper and lower teeth engageable with said locking feature on the arm, the lock member being pivotable between a first position in which the lower teeth are engaged, a second position in which no teeth are engaged to allow tilting of the steering column shaft, and a third position in which the upper teeth are engaged so that tilt adjustment is locked while the operator adjusts telescopic position.

5. The tilting and telescoping steering column assembly of claim 1, wherein said telescope gear member includes an inner gear which is engageable with the pawl and first and second outer gears engaged with the internal rack.

6. The tilting and telescoping steering column assembly of claim 5, further comprising an energy dissipation device positioned between said inner and outer gears to dissipate energy when the outer gears are forcibly rotated with respect to the inner gear.

7. The tilting and telescoping steering column assembly of claim 6, wherein said energy dissipation device comprises a pin connected to the inner gear and engaged with slots formed on first and second steel disks which are connected to the first and second outer gears, respectively, such that forcible rotation of the outer gears causes the disks to cold form as the pin is forced through the slots.

8. The tilting and telescoping steering column assembly of claim 1, further comprising a plurality of roller devices on the telescope sleeve to facilitate telescoping movement of the sleeve with respect to the housing, each said roller device including first and second axially offset washers which are configured to counter-rotate during telescoping movement of the sleeve.

9. The tilting and telescoping steering column assembly of claim 8, wherein said washers are positioned on axles which are rotationally spring-biased to force the washers against opposing walls of the respective channel which receives the washers.

10. A tilting and telescoping steering column assembly comprising:
    a steering column shaft pivotally connected to an intermediate shaft at a tilt pivot joint;
    a tilt locking mechanism operatively associated with the steering column shaft to allow selective tilting adjustment of the steering column shaft;
    a telescope locking mechanism operatively associated with the intermediate shaft to allow selective tilting adjustment of the steering column shaft; and
    a linkage including a first portion which is pivotally movable with the steering column shaft, a second portion operatively connected to the tilt and telescope locking mechanisms, and a slidable link member between said first and second portions adjacent the tilt pivot joint, said slidable link member connected to the second portion by an arcuate slot member and slot follower pin to accommodate pivotal movement of the first portion with respect to the second portion.

11. The tilting and telescoping steering column assembly of claim 10, wherein said tilt pivot joint includes a pivot axis, and the slidable link member is intersected by the pivot axis.

12. The tilting and telescoping steering column assembly of claim 11, wherein said arcuate slot member is integral with the slidable link member.

13. The tilting and telescoping steering column assembly of claim 10, further comprising an actuating lever connected to the linkage and pivotable with the steering column shaft during tilting adjustment of the steering column shaft.

14. The tilting and telescoping steering column assembly of claim 10, further comprising a lost motion device positioned between the linkage and the tilt locking mechanism to allow movement of the linkage to operate the telescope locking mechanism when the tilt locking mechanism is locked.

* * * * *